(12) United States Patent
Suzuki et al.

(10) Patent No.: US 7,997,637 B2
(45) Date of Patent: Aug. 16, 2011

(54) RESINOUS IMPACT-ENERGY ABSORBER FOR ABSORBING SIDE IMPACT ENERGY

(75) Inventors: Toshihiro Suzuki, Gamagori (JP); Kazuomi Amanai, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 146 days.

(21) Appl. No.: 12/416,322

(22) Filed: Apr. 1, 2009

(65) Prior Publication Data
US 2009/0250966 A1 Oct. 8, 2009

(30) Foreign Application Priority Data
Apr. 8, 2008 (JP) ................................. 2008-100605

(51) Int. Cl.
*B60J 5/00* (2006.01)
(52) U.S. Cl. .................................................. 296/146.7
(58) Field of Classification Search ............... 296/146.7, 296/146.6, 39.1; 280/751
See application file for complete search history.

(56) References Cited

U.S. PATENT DOCUMENTS

| | | | | |
|---|---|---|---|---|
| 4,769,951 A | * | 9/1988 | Kaaden | 49/502 |
| 5,040,335 A | * | 8/1991 | Grimes | 49/502 |
| 5,154,445 A | * | 10/1992 | Weller | 280/751 |
| 5,306,066 A | | 4/1994 | Saathoff | |
| 5,395,135 A | * | 3/1995 | Lim et al. | 280/751 |
| 5,435,619 A | * | 7/1995 | Nakae et al. | 296/187.12 |
| 5,447,326 A | * | 9/1995 | Laske et al. | 280/728.3 |
| 5,466,031 A | * | 11/1995 | Uchida et al. | 296/146.6 |
| 5,482,344 A | * | 1/1996 | Walker et al. | 296/39.1 |
| 5,542,738 A | * | 8/1996 | Walker et al. | 296/187.05 |
| 5,544,913 A | * | 8/1996 | Yamanishi et al. | 280/730.2 |
| 5,573,272 A | * | 11/1996 | Teshima | 280/751 |
| 5,573,298 A | * | 11/1996 | Walker et al. | 296/187.12 |
| 5,636,866 A | * | 6/1997 | Suzuki et al. | 280/748 |
| 5,749,600 A | * | 5/1998 | Yamada et al. | 280/751 |
| 5,806,889 A | * | 9/1998 | Suzuki et al. | 280/748 |

(Continued)

FOREIGN PATENT DOCUMENTS
EP 1352791 10/2003
(Continued)

OTHER PUBLICATIONS
English language Abstract and translation of JP 8-142234 A (Jun. 4, 1996).
(Continued)

*Primary Examiner* — Kiran B. Patel
(74) *Attorney, Agent, or Firm* — Greenblum & Bernstein, P.L.C.

(57) ABSTRACT

A resinous impact-energy absorber 1 includes a cross rib 11 that includes four ribs 11A and a connected portion 11B. The four ribs 11A are connected with each other in a single cross shape by the connected portion 11B. Each of the ribs 11A has an opposed edge 11C and a side edge. The opposed edge 11C has a distance S1 from the door trim 2. The resinous impact-energy absorber 1 also includes one outer wall 12 connected with one of the side edges of the ribs 11A. The at least one outer wall 12 has a contact edge 12A capable of making contact with an outside surface of the door trim 2. The resinous impact-energy absorber 1 also includes at least one seating face 14 for securing the cross rib 11 to the outside surface of the door trim 2 via the at least one outer wall 12.

8 Claims, 13 Drawing Sheets

U.S. PATENT DOCUMENTS

| | | | | |
|---|---|---|---|---|
| 5,857,702 | A * | 1/1999 | Suga et al. | 280/751 |
| 5,865,496 | A * | 2/1999 | Odan et al. | 296/146.6 |
| 5,934,730 | A * | 8/1999 | Yagishita et al. | 296/39.1 |
| 6,036,251 | A * | 3/2000 | Yagishita et al. | 296/39.1 |
| 6,203,096 | B1 * | 3/2001 | Noda et al. | 296/146.6 |
| 6,364,359 | B1 * | 4/2002 | Dietrich | 280/801.2 |
| 6,474,721 | B2 * | 11/2002 | Nishikawa et al. | 296/146.6 |
| 6,637,786 | B2 * | 10/2003 | Yamagiwa | 293/102 |
| 6,672,648 | B2 * | 1/2004 | Heranney | 296/146.6 |
| 6,688,671 | B2 * | 2/2004 | Fukutomi | 296/146.6 |
| 6,705,653 | B2 * | 3/2004 | Gotanda et al. | 293/132 |
| 6,729,451 | B2 * | 5/2004 | Yamagiwa | 188/377 |
| 6,808,224 | B1 * | 10/2004 | Obara | 296/146.5 |
| 6,851,740 | B1 * | 2/2005 | Peng | 296/187.12 |
| 6,871,888 | B2 * | 3/2005 | Yamagiwa | 293/102 |
| 7,357,444 | B2 * | 4/2008 | Cowelchuk et al. | 296/187.05 |

FOREIGN PATENT DOCUMENTS

| | | |
|---|---|---|
| JP | 07-164878 | 6/1995 |
| JP | 8-142234 A | 6/1996 |
| JP | 9-207576 A | 8/1997 |
| JP | 11-334506 A | 12/1999 |
| JP | 2007-055549 A | 3/2007 |

OTHER PUBLICATIONS

English language Abstract and translation of JP 2007-055549 A (Mar. 8, 2007).

English language Abstract of JP 11-334506 A (Dec. 7, 1999).

English language Abstract of JP 9-207576 A (Aug. 12, 1997).

Chinese Office Action, dated Dec. 6, 2010.

* cited by examiner

RESINOUS IMPACT-ENERGY ABSORBER FOR ABSORBING SIDE IMPACT ENERGY

CROSS REFERENCE TO RELATED APPLICATION

This application claims priority from Japanese Patent Application No. 2008-100605 filed on Apr. 8, 2008. The entire content of this priority application is incorporated herein by reference.

TECHNICAL FIELD

The present invention relates to a resinous impact-energy absorber for absorbing side impact energy and to be attached to an outside surface of a door trim with respect to the vehicle compartment.

BACKGROUND

There are many kinds of known arts concerning a resinous impact-energy absorber for absorbing side impact energy. While a door trim has an outside surface with respect to the door trim, the resinous impact-energy absorbers are attached to the outside surface of the door trim. Japanese Unexamined Patent Application Publication No. 8-142234 discloses one type of such a resinous impact-energy absorber, which has a bottom plate and a plurality of ribs. The plurality of ribs extend from the bottom plate and form a lattice shape, and the bottom plate is attached to the outside surface of the door trim. On the other hand, Japanese Unexamined Patent Application Publication No. 2007-55549 discloses a box-type having outer peripheral walls and a top plate integrally provided with the outer peripheral walls. The outer peripheral walls, which extend from the outside surface of the door trim and have a rectangular cylindrical shape, define an opening at the distal end thereof. The opening is closed by a top plate.

However, the former one is, because of the lattice shape, difficult to release from the mold at a time of molding process. Therefore, the height of the rib portions is limited to the extent releasable from the mold (limited to approximately 30 mm). Furthermore, the adjacent rib portions can fall down with leaning against each other, which disturbs buckling of the ribs. Thus, the resinous lattice-shaped impact-energy absorber for absorbing side impact energy cannot stably absorb the impact energy.

On the other hand, the latter one is configured to receive the impact energy on the top plate thereof. However, the larger is the top plate, the lower is the rigidity at the central portion of the top panel (and thus, the size of the top plate is limited to approximately 100 mm in length and 100 mm in width). Furthermore, because the initial load is caused and the impact energy is absorbed only upon the outer peripheral walls making contact with the door trim, the impact energy cannot be absorbed until the outer peripheral walls make contact with the door trim under the impact energy in the event of side impact. Therefore, it is difficult to mount the impact-energy absorber on the door trim without being affected by the concave-convex shape of the door trim.

Therefore, it is a need for the resinous impact-energy absorber that can be mounted to the door trim without being affected by the concave-convex shape of the door trim and, furthermore, can stably absorb the impact energy in the event of side impact.

SUMMARY

One aspect of the present invention is a resinous impact-energy absorber for use with a door trim of a vehicle and for absorbing side impact energy, the door trim having an outside surface with respect to the vehicle compartment. The resinous impact-energy absorber is configured to be attached to the outside surface of the door trim. The resinous impact-energy absorber includes a cross rib. The cross rib includes four ribs and a connected portion. The four ribs extend in a direction to cross the outside surface of the door trim and are connected with each other in a single cross shape by the connected portion. Each of the ribs has an opposed edge and a side edge. The opposed edge is opposed to the door trim and having a distance from the door trim, and the side edge is located at a side opposite from the connected portion. The resinous impact-energy absorber also includes at least one outer wall connected with at least one of the side edges of the ribs in a T-shape. The at least one outer wall has a contact edge capable of making contact with the outside surface of the door trim. The resinous impact-energy absorber also includes at least one seating face for securing the cross rib to the outside surface of the door trim via the at least one outer wall. The at least one seating face extends from the contact edge of the at least one outer wall and along the outside surface of the door trim.

With this configurations, because the ribs are fixed by the respective outer walls and by the connected portion, the ribs are restricted in falling down toward the door trim and thus are ensured in buckling in an event of side impact. Specifically, first, while the opposed edges of the ribs have a distance from the door trim, the entire cross rib is deformed so that the opposed edges of the ribs approach the door trim within the distance, and thereby the impact energy is absorbed. Next, the ribs buckle, and thereby the impact energy is absorbed. The buckling behavior of the cross rib can be stabilized in that manner. Furthermore, when mounting the resinous impact-energy absorber to the door trim, it is unnecessary to make entire contact of the contact edge of the outer wall with the door trim; it is only necessary to attach the seating face to the door trim and secure thereto. Therefore, the resinous impact-energy absorber can be mounted to the door trim without being affected by the concave-convex shape of the door trim. This serves for mounting the resinous impact-energy absorber without being affected by the concave-convex shape of the door trim and, furthermore, for stably absorbing the impact energy in the event of side impact.

Another aspect in accordance with the present invention may be configured as follows.

The resinous impact-energy absorber further includes a top plate opposed to the outside surface of the door trim. The cross rib has an end edge at a side opposite from the door trim. The top plate is connected with the end edge of the cross rib.

With this configuration, the impact energy can be received wherever within the area where the top plate is located, and the impact energy received on the top plate can be reliably transferred to the cross rib.

The at least one outerwall has an end edge at a side opposite from the contact edge thereof. The contact edge of the at least one outer wall is shorter than the end edge.

With this configuration, the outer wall can be downsized in comparison with a case where the contact edge has the same width with the end edge located at the side opposite from the contact edge. This serves for slowly raising the initial load in the event of side impact and, in addition, for saving the weight of the resinous impact-energy absorber.

The resinous impact-energy absorber further includes at least one restricting portion. The top plate has at least one corner portion. The at least one outer wall includes a first outer wall and a second outer wall adjacent to the first outer wall. The at least one restricting portion is disposed at least one of on and near the at least one corner portion of the top plate. The at least one restricting portion connects the first outer wall with the second wall in an L-shape.

With this configuration, deflection near the corner portion of the top plate can be restricted. This serves for reliably transfer the impact energy to the cross rib even if the impact energy is received at the corner portion of the top plate.

In accordance with the present invention, the resinous impact-energy absorber for absorbing side impact energy can have the simple configuration. Therefore, the resinous impact-energy absorber can be easily released from the mold at a time of forming process. Furthermore, the ribs are restricted in leaning against each other and thus are less disturbed in buckling when falling down in the event of side impact. Furthermore, the distance between the cross rib and the door trim serves for reducing the initial load in the event of side impact. Furthermore, because the ribs are connected to the respective outer walls, and these outer walls are attached and secured to the door trim via the seating faces, the ribs can reliably buckle and thereby stably absorb the impact energy.

DETAILED DESCRIPTION

First Embodiment

Figure 1:
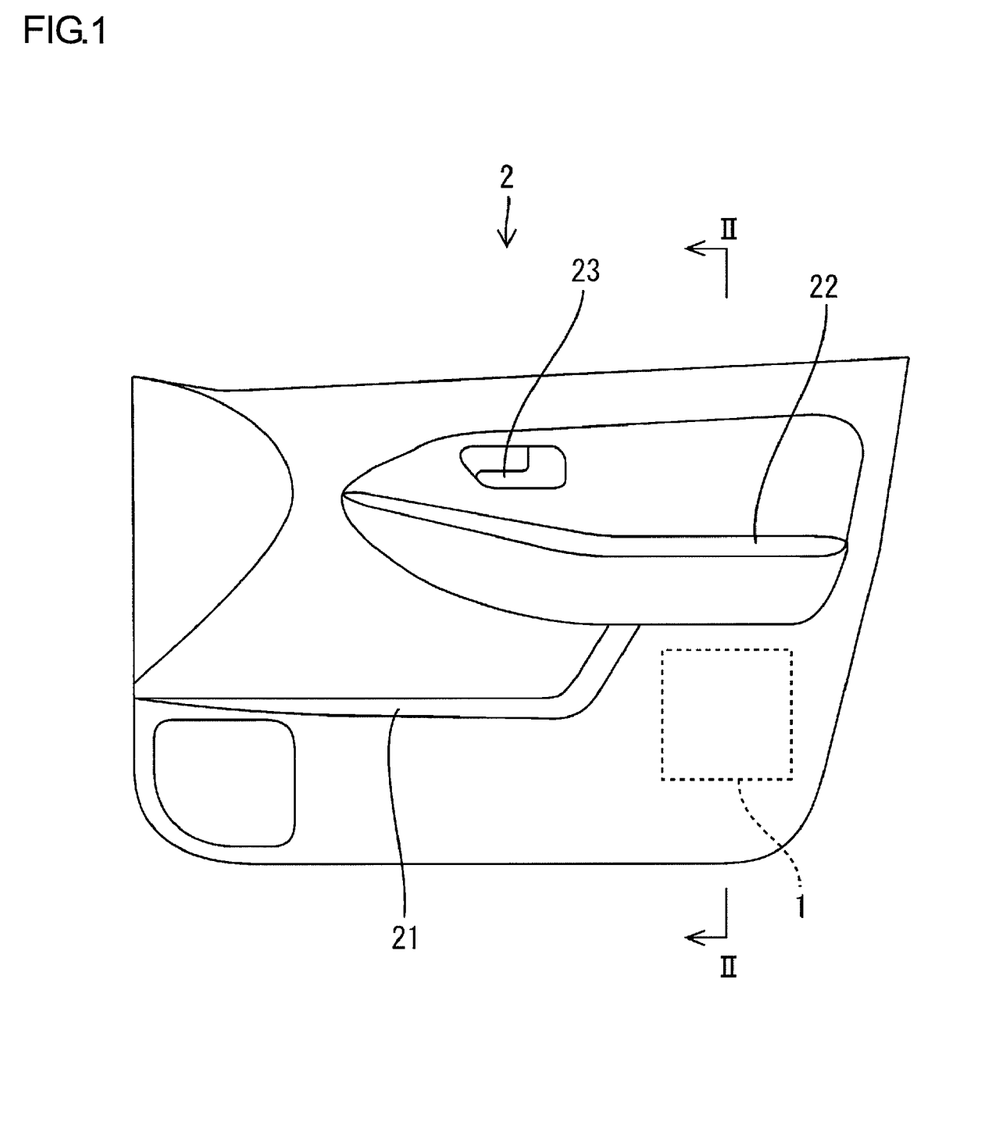
FIG. 1 is a front view of a door trim of a first embodiment.
Figure 2:
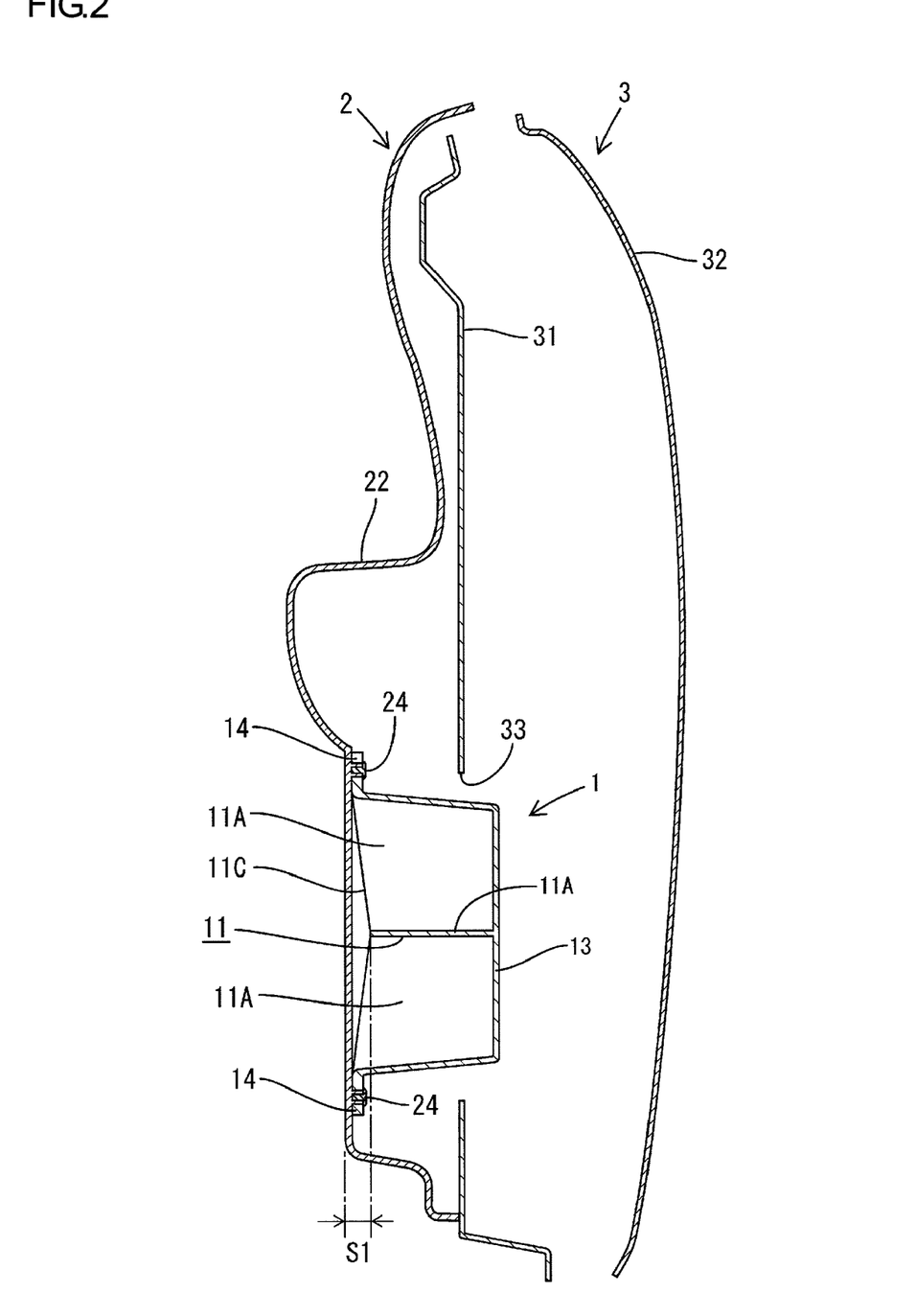
FIG. 2 is a cross-sectional view taken along the line II-II in FIG. 1.

A first embodiment in accordance with the present invention will be explained with reference to FIGS. 1 through 10. As shown in FIG. 1, a door trim 2 of this embodiment includes a door pocket 21, an armrest 22, an inside handle 23, and the like. As shown in FIG. 2, the door trim 2 is secured inside a door panel 3 with respect to the vehicle compartment. The door panel 3 includes an inner panel 31 disposed inside the vehicle compartment and an outer panel 32 disposed outside the vehicle compartment.

A resinous impact-energy absorber 1 is an illustration of a resinous impact-energy absorber for absorbing side impact energy. While the door trim 2 has an outside surface with respect to the vehicle compartment, the resinous impact-energy absorber 1 is mounted to the outside surface of the door trim 2. Note that the outside and the inside with respect to the vehicle compartment will hereinafter be referred to simply as "the outside" and "the inside", respectively. The resinous impact-energy absorber 1 is disposed correspondingly to a zone on and around the waist of the occupant sitting in a seat (not illustrated). The resinous impact-energy absorber 1 is opposed to the door panel 3. Thus, when impact energy is applied from a lateral side of the vehicle in the event of side impact, the door panel 3 is deformed toward the inside and makes contact with the resinous impact-energy absorber 1. Note that the resinous impact-energy absorber 1 is made of polypropylene and the like.

Figure 3:
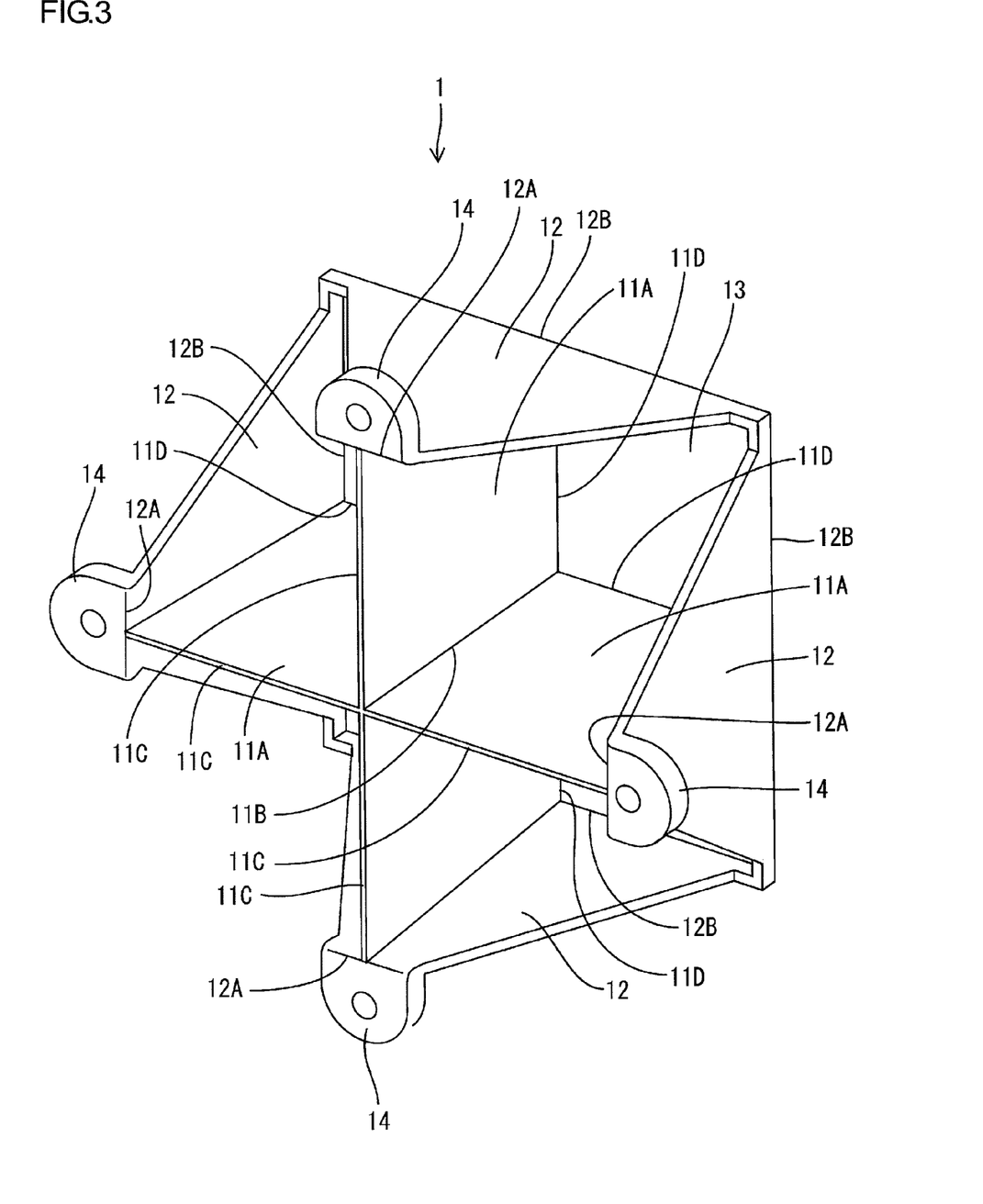
FIG. 3 is a perspective view of a resinous impact-energy absorber of FIG. 1 as viewed from the door-trim side.

As shown in FIG. 3, the resinous impact-energy absorber 1 includes a cross rib 11, four outer walls 12, a top plate 13, four seating faces 14, and the like. The cross rib 11 has a cross shape.

The cross rib 11 has four ribs 11A extending in a direction to cross the outside surface of the door trim 2. The ribs 11A are connected with each other by a connected portion 11B located in the center of the cross shape. The ribs 11A extend radially at equal angles (90°) from this connected portion 11B. Because such a simple configuration is adopted to the cross rib 11, it is easier to release the resinous impact-energy absorber 1 from a mold at a time of forming process in comparison with a lattice-shaped impact-energy absorber. Therefore, the ribs 11A can have a height greater than that of the lattice-shaped one. For example, the height may be equal to or greater than 100 mm so that a greater displacement amount at a time of buckling can be realized. Furthermore, while there is a free running distance between the resinous impact-energy absorber 1 and the outer panel 32, the free running distance also can be suitably adjusted.

Each of the ribs 11A has a side edge at the opposite side from the connected portion 11B. The side edge is connected with respective one of the outer walls 12 in a T-shape. Each of the outer walls 12 has a contact edge 12A and an end edge 12B. The contact edge 12A can make contact with the outside surface of the door trim 2. The end edge 12B is disposed at the side opposite from the door trim 2. The contact edge 12A is shorter than the end edge 12B. The width of the outer wall 12 is gradually narrowed from the end edge 12B toward the contact edge 12A. In other words, the resinous impact-energy absorber 1 of this embodiment has a lattice shape with each corner portion obliquely cut away therefrom. This serves for saving the weight of the resinous impact-energy absorber 1. Furthermore, this serves for reducing the rigidity of the outer walls 12 so that the initial load applied to the occupant in the event of side impact is slowly increased.

A seating face 14 outwardly extends from the contact edge 12A of each of the outer walls 12 in a direction along the outside surface of the door trim 2. Each of the seating faces 14 has a seating hole. Resinous bosses 24, which are integral with the door trim 2, are inserted in these seating holes and are welded by ultrasonic welding, and thus the seating faces 14 are securely attached to the door trim 2. Thus, the cross rib 11 can be secured via the outer walls 12 and the seating faces 14 to the portion below the armrest 22. Note that the seating faces 14 may be secured to the door trim 2 by means other than ultrasonic welding; screwing up, claw engagement, or the like can be adopted as this means. While it is necessary for a box-shaped resinous impact-energy absorber to be in contact at the outer peripheral walls thereof with a door trim when mounted to the door trim 2, it is only necessary that the seating faces 14 be securely attached to the door trim 2. Therefore, the resinous impact-energy absorber 1 can stably absorb impact energy without being affected by the concave-convex shape of the door trim 2.

Because each of the ribs 11A are secured to the respective outer walls 12, the ribs 11A are less disturbed in buckling when falling down toward the door trim 2 in the event of side impact. Thus, each rib 11A buckles while is forced to fall down toward the door trim 2 in an overlapping manner, so that the buckling behavior can be stabilized. Furthermore, because the seating faces 14 are provided correspondingly to connected portions of the ribs 11A with the respective outer walls 12, the buckling behavior of the cross rib 11 can be still more stabilized.

The cross rib 11 has an end edge 11D located at the outside end thereof (at the side opposite from the outside surface of the door trim 2). The top plate 13 is disposed in a manner opposed to the outside surface of the door trim 2 and is connected with the end edge 11D. The top plate 13 has a substantially square shape, and its four sides are connected with respective end edges 12B of the outer walls 12. Thus, the impact energy received on the top plate 13 in the event of side impact can be reliably transferred to the cross rib 11. That is, the impact energy can be received wherever within the area where the top plate 13 is located, and the impact energy received on the top plate can be transferred to the cross rib 11.

Each of the ribs 11A has an opposed edge 11C opposed to the door trim 2. The opposed edge 11C has an incline slightly toward the outside between the contact edge 12A of respective one of the outer walls 12 and the connected portion 11B. Therefore, in the state where the resinous impact-energy absorber 1 is mounted on the plane portion of the door trim 2, the opposed edges 11C has a distance S1 from the door trim 2, as shown in FIG. 2. This distance S1 is the largest at the connected portion 11B. Thus, upon the resinous impact-energy absorber 1 receiving the impact energy from the outside, the entire cross rib 11 is deformed via the door panel 3 so that the opposed edges 11C approach the door trim 2 and, after the entire opposed edges 11C make contact with the door trim 2, the ribs 11A start to buckle in the overlapping manner.

Figure 4:
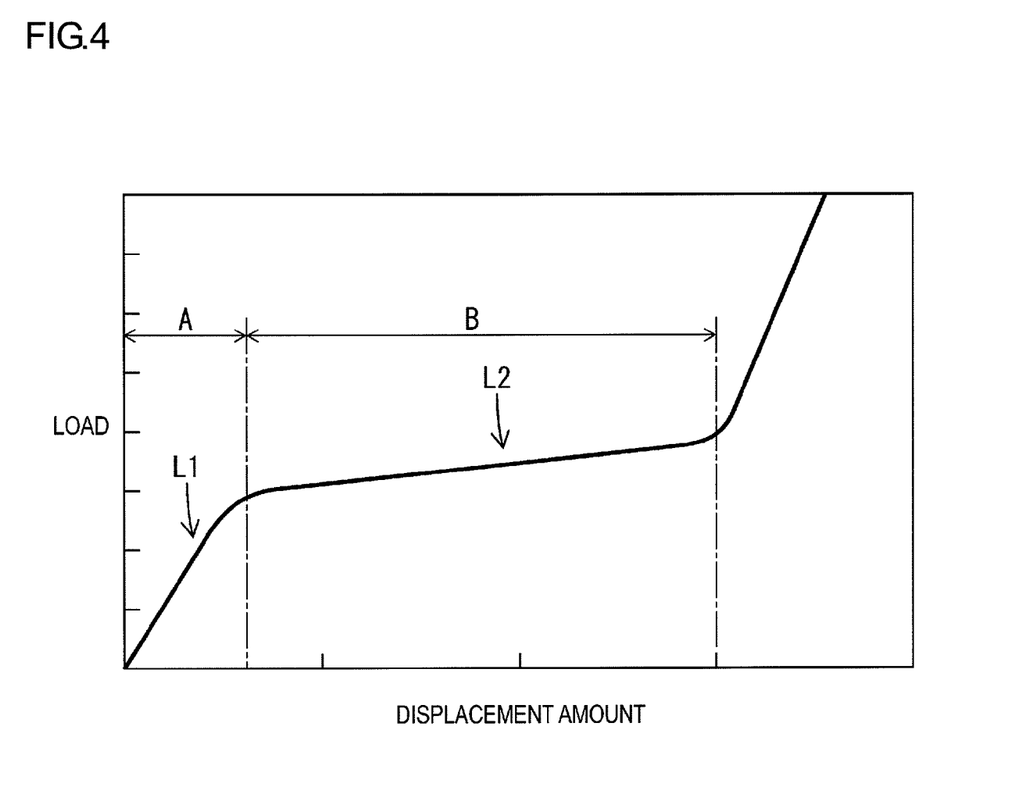
FIG. 4 is a graph showing loading characteristics of the resinous impact-energy absorber.

Here, in order to assess the impact-energy absorbing performance of the resinous impact-energy absorber 1, the load received at the inside of the door trim 2 was measured. The results are shown in FIG. 4. The horizontal axis in FIG. 4 indicates the displacement amount whereby the resinous impact-energy absorber 1 was forced into the inside due to side impact. The location where the door panel 3 made contact with the resinous impact-energy absorber 1 is set as zero, and the displacement amount whereby the resinous impact-energy absorber 1 moved to the inside is indicated by this horizontal axis. On the other hand, the vertical axis in FIG. 4 indicates the load absorbed during the deformation. The load in a zone "A" in FIG. 4 indicates an initial load L1 that was caused while the opposed edges 11C of the cross rib 11 were approaching the door trim 2; the load in a zone B in FIG. 4 indicates a main load L2 that was caused while each ribs 11A were buckling.

Figure 5:
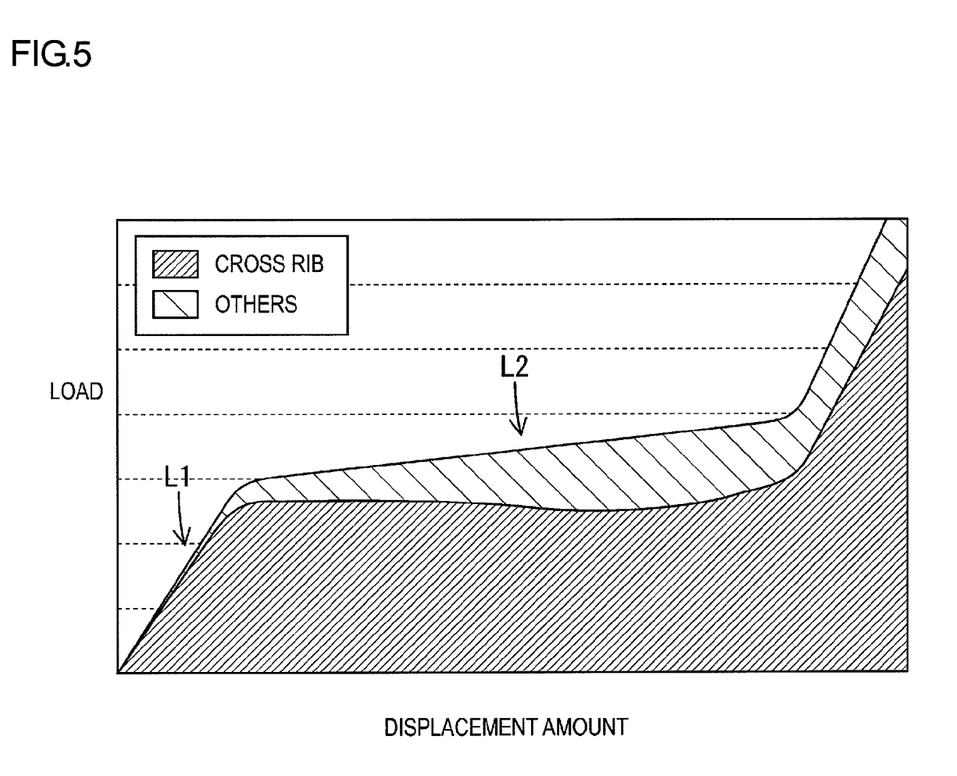
FIG. 5 is a graph showing details of contribution of a cross rib to the loading characteristics of FIG. 4.

Furthermore, out of the load indicated in FIG. 4, the load caused by the cross rib 11 is indicated in FIG. 5. It is found from this figure that the almost entire initial load L1 was caused by the cross rib 11. Accordingly, it is found that the initial load L1 can be suitably adjusted by adjusting the shape, the position, the size, and the like of the cross rib 11. Likewise, it is found that most of the main load L2 also was caused by the cross rib 11. Particularly, in the main load L2, the load caused by the cross rib 11 was substantially constant. Accordingly, it was confirmed that the buckling behavior of the cross rib 11 is controlled by the outer walls 12 with higher accuracy, so that the cross rib 11 can absorb the substantially constant impact energy.

Figure 6:
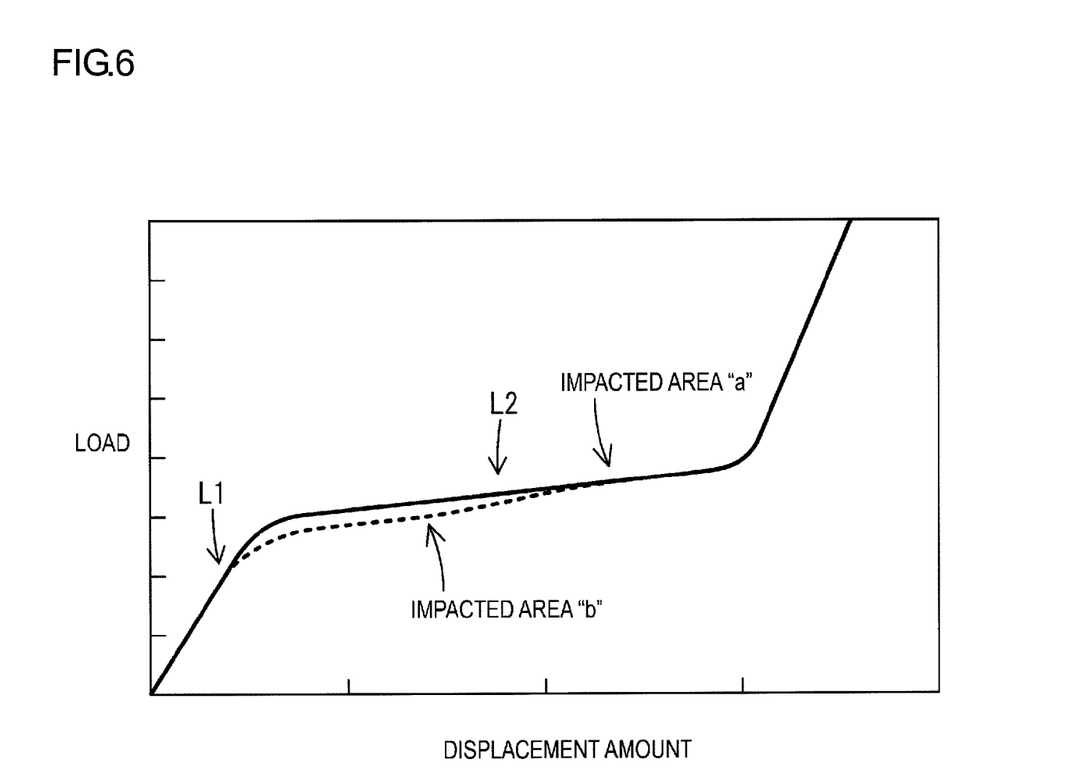
FIG. 6 is a graph obtained by measuring the load with applying the impact energy to different impacted areas on the top plate of the resinous impact-energy absorber.
Figure 7:
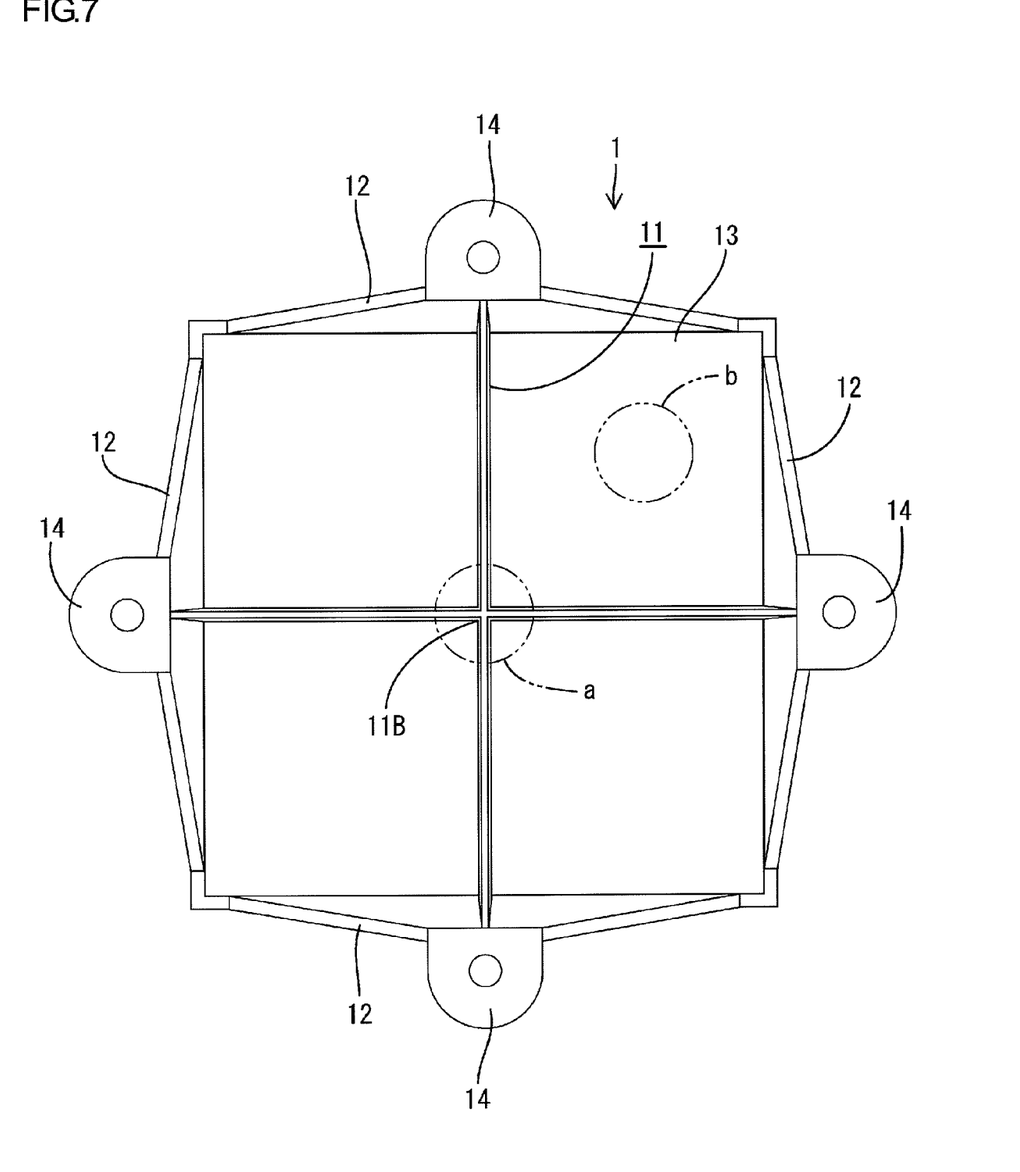
FIG. 7 is a rear view of the resinous impact-energy absorber as viewed from the door-trim side, the rear view showing locations of the impacted areas in FIG. 6.

Next, the load was measured with applying the impact energy to each of different areas on the top plate 13. The results are shown in FIG. 6, while the impacted areas are shown in FIG. 7. An impacted area "a" in FIG. 7 is an area located on the top plate 13 and corresponding to the connected portion 11B, i.e. is an area that can receive the impact energy from the outside even if the top plate 13 were not provided. Therefore, the load does not vary regardless of whether or not the top plate 13 is provided. On the other hand, the impacted area "b" in FIG. 7 is an area where the cross rib 11 should not be provided. That is, the impacted area "b" is an area that can receive the impact energy from the outside owing to the top plate 13 provided therein. In this regard, the impacted area "a" and the impacted area "b" indicate substantially the same behavior in FIG. 6. This shows that the area capable of receiving the impact energy from the outside is widened by the top plate 13. In addition, this also shows that the impact energy can be absorbed with the substantially equal impact-energy absorbing performance wherever within the area where the top plate 13 is located.

Figure 8:
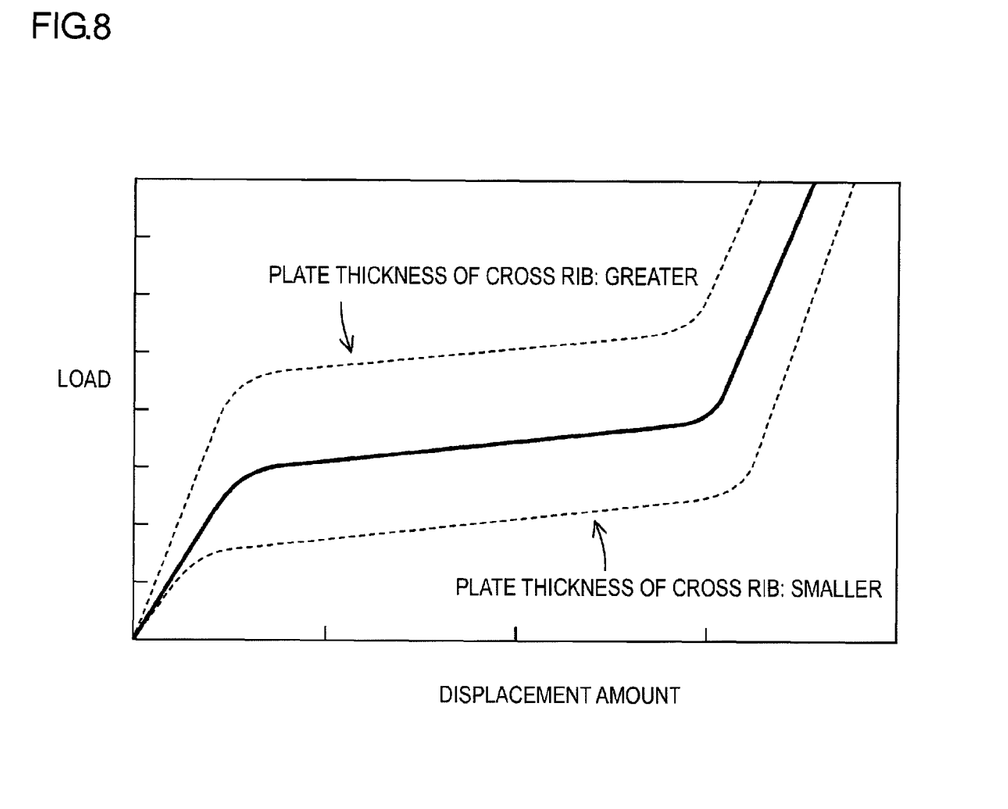
FIG. 8 is a graph obtained by measuring the load using the resinous impact-energy absorber having a cross rib of a plate thickness different from that of FIG. 1.
Figure 9:
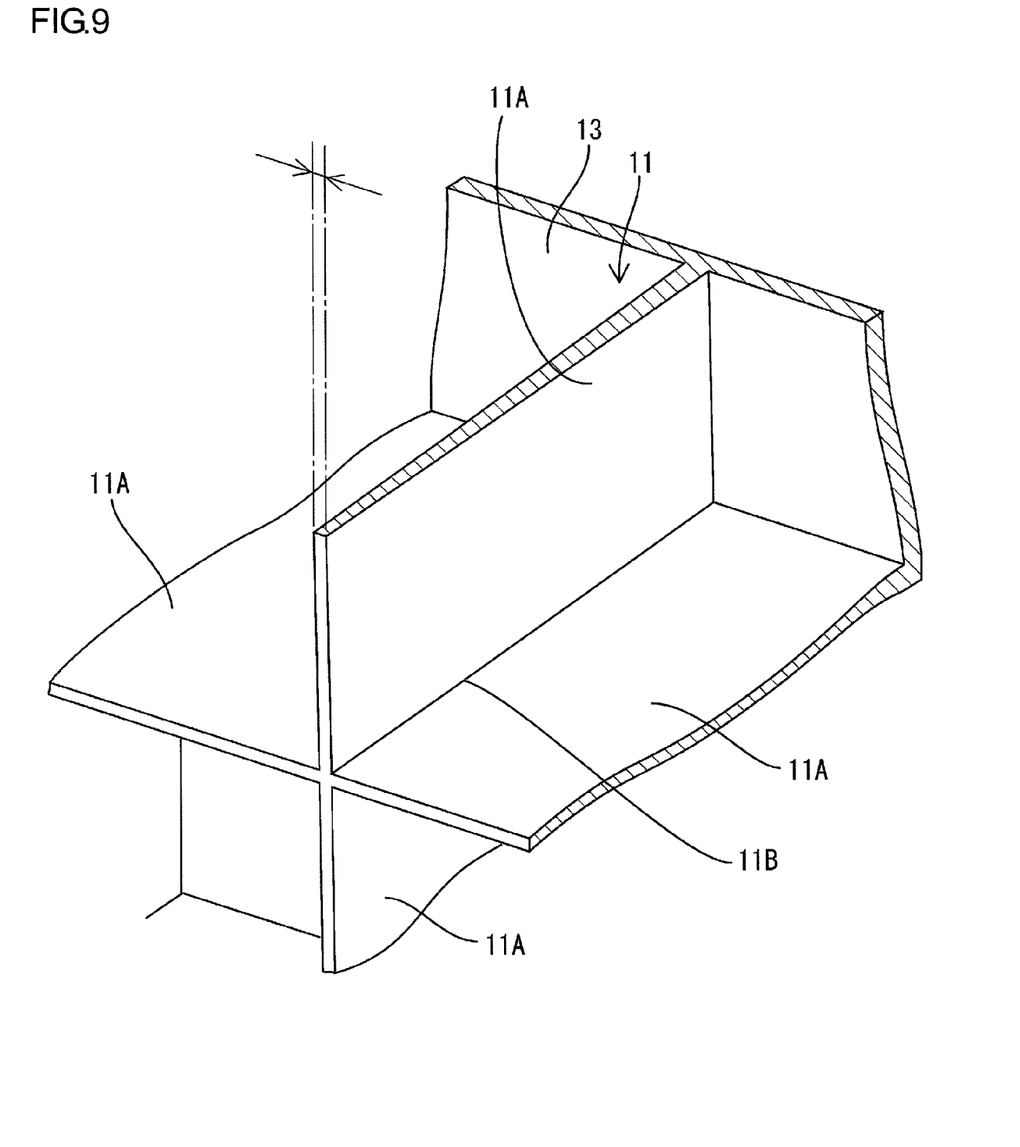
FIG. 9 is a perspective view showing places where the plate thickness of the cross rib of FIG. 8 was measured.

Next, in order to suitably adjust the impact-energy absorbing performance of the resinous impact-energy absorber 1, the load was measured using the ribs 11A having a different plate thickness. The results are shown in FIG. 8. Note that, specifically, each rib 11A has a thickness gradually smaller from the top plate 13 side toward the door trim 2 side, as shown in FIG. 9. The thickness of the ribs 11A was measured at an end edge of the door trim 2 side (i.e. at the opposed edge 11C). It was confirmed as a result of this that, in a case where the plate thickness of each rib 11A is greater, both of the initial load L1 and the main load L2 are uniformly greater, as indicated by an upper dashed line in FIG. 8. Likewise, it was confirmed that, in a case where the plate thickness of each rib 11A is smaller, both of the initial load L1 and the main load L2 are uniformly less, as shown by a lower dashed line in FIG. 8.

Figure 10:
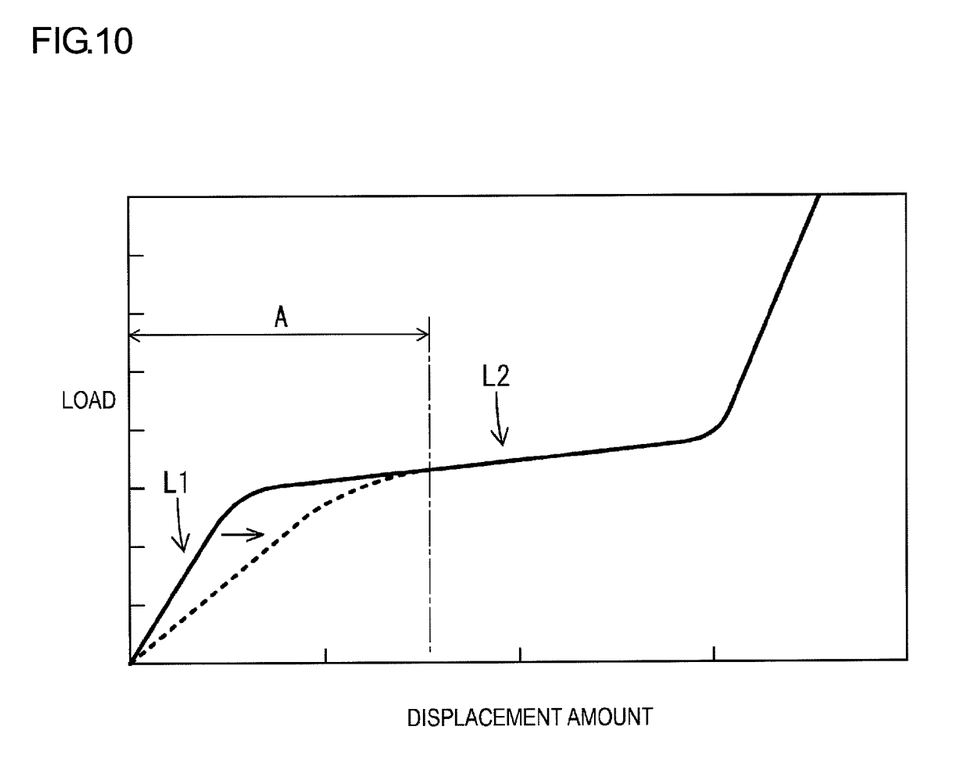
FIG. 10 is a graph obtained by measuring the load using the resinous impact-energy absorber having a distance between opposed edges of ribs of the cross rib and the door trim different from that of FIG. 2.

Next, in order to slowly increase the initial load L1, the load was measured using the resinous impact-energy absorber 1 having a larger distance S1 between the opposed edges 11C of the cross rib 11 and the door trim 2. The results are shown in FIG. 10. A zone "A" in FIG. 10 indicates the zone where in the initial load L1 increases. The solid line in FIG. 10 indicates the initial load L1 of the normal resinous impact-energy absorber 1, while the dashed line in FIG. 10 indicates the initial load L1 of the resinous impact-energy absorber 1 having the larger distance S1. Thus, it was confirmed that the larger distance S1 results in slower increase of the initial load L1.

The configuration of this embodiment is as above. Next, the operation of this embodiment will be explained. First, when the vehicle receives the impact energy from the lateral side, the door panel 3 is deformed toward the inside. Then, when the door panel 3 makes contact with the top plate 13 of the resinous impact-energy absorber 1, the impact energy from the door panel 3 is transferred to the cross rib 11.

The ribs 11A are connected to each other at the connected portion 11B and, furthermore, are connected to the respective outer walls 12. Therefore, the ribs 11A are restricted in falling down without buckling, and the opposed edges 11C approach toward the door trim 2 as the entire cross rib 11 is deformed.

Meanwhile, the entire cross rib 11 absorbs the impact energy applied from the outside, so that the initial load L1 applied to the occupant can be slowly increased.

Next, when the entire opposed edges 11C of the ribs 11A make contact with the door trim 2, the ribs 11A start to buckle. The behavior of the ribs 11A are controlled by the outer walls 12 even at the time of buckling, so that the ribs 11A buckle in the overlapping manner toward the door trim 2. Thus, the ribs 11A perform the desirable impact-energy absorbing performance while keeping the substantially constant load. Furthermore, because the simple configuration of the cross rib 11 is adopted, the ribs 11A having the greater height can be formed, so that a longer stroke for absorbing the impact energy at the time of buckling can be obtained.

As explained above, this embodiment has the simple configuration of the cross rib 11. Therefore, it is easier to release the resinous impact-energy absorber 1 from the mold at the time of forming process, and the ribs 11A having the greater height can be formed. This serves for obtaining the longer impact-energy absorbing stroke at the time of buckling. In addition to this, because the ribs 11A, which configure the cross rib 11, are connected to the respective outer walls 12, the buckling behavior can be controlled with higher accuracy. Furthermore, increase of the initial load L1 can be suitably adjusted by adjusting the distance S1 between the opposed edges 11C of the ribs 11A and the door trim 2. Furthermore, the impact-energy absorbing amount of the resinous impact-energy absorber 1 can be suitably adjusted by adjusting the plate thickness of the ribs 11A.

Second Embodiment

Figure 11:
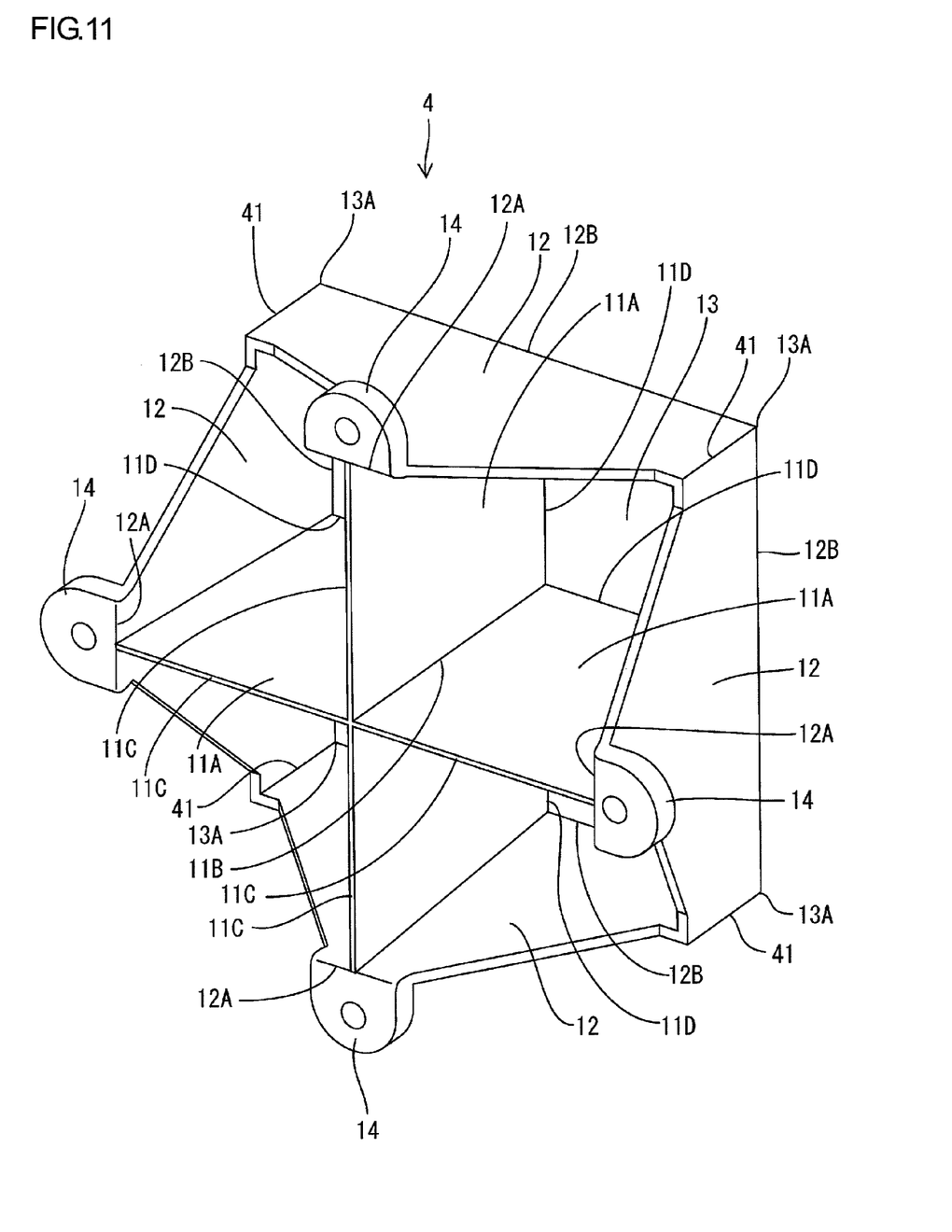
FIG. 11 is a perspective view of the resinous impact-energy absorber of a second embodiment as viewed from the door trim side.
Figure 12:
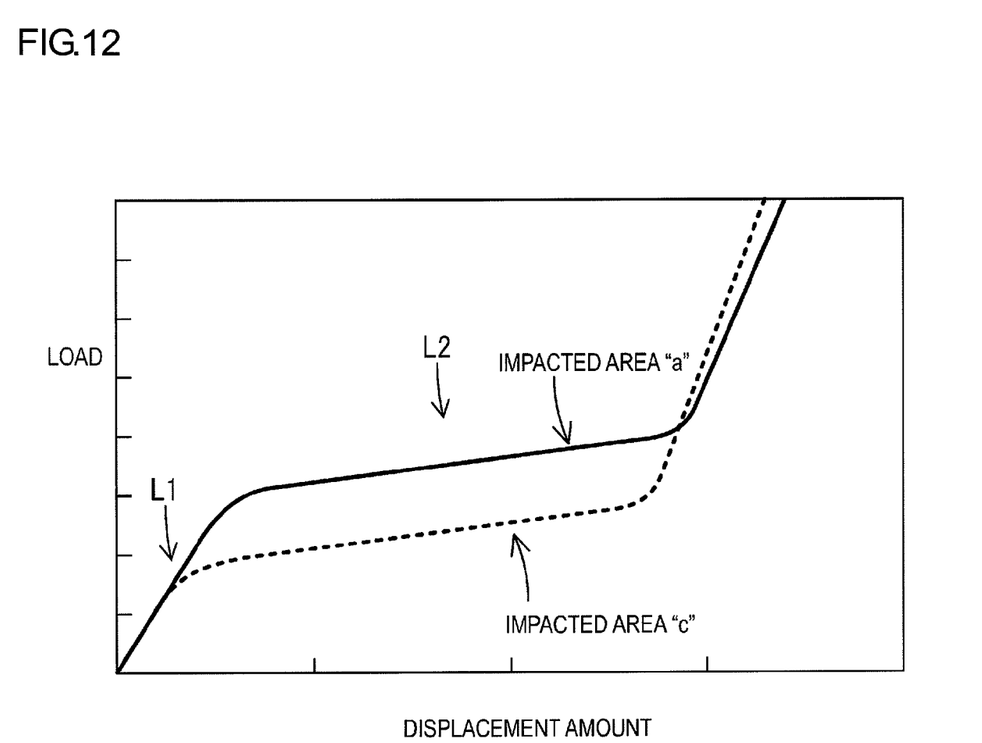
FIG. 12 is a graph obtained by measuring the load with applying the impact energy to different impacted areas on the top plate of the resinous impact-energy absorber of FIG. 11.
Figure 13:
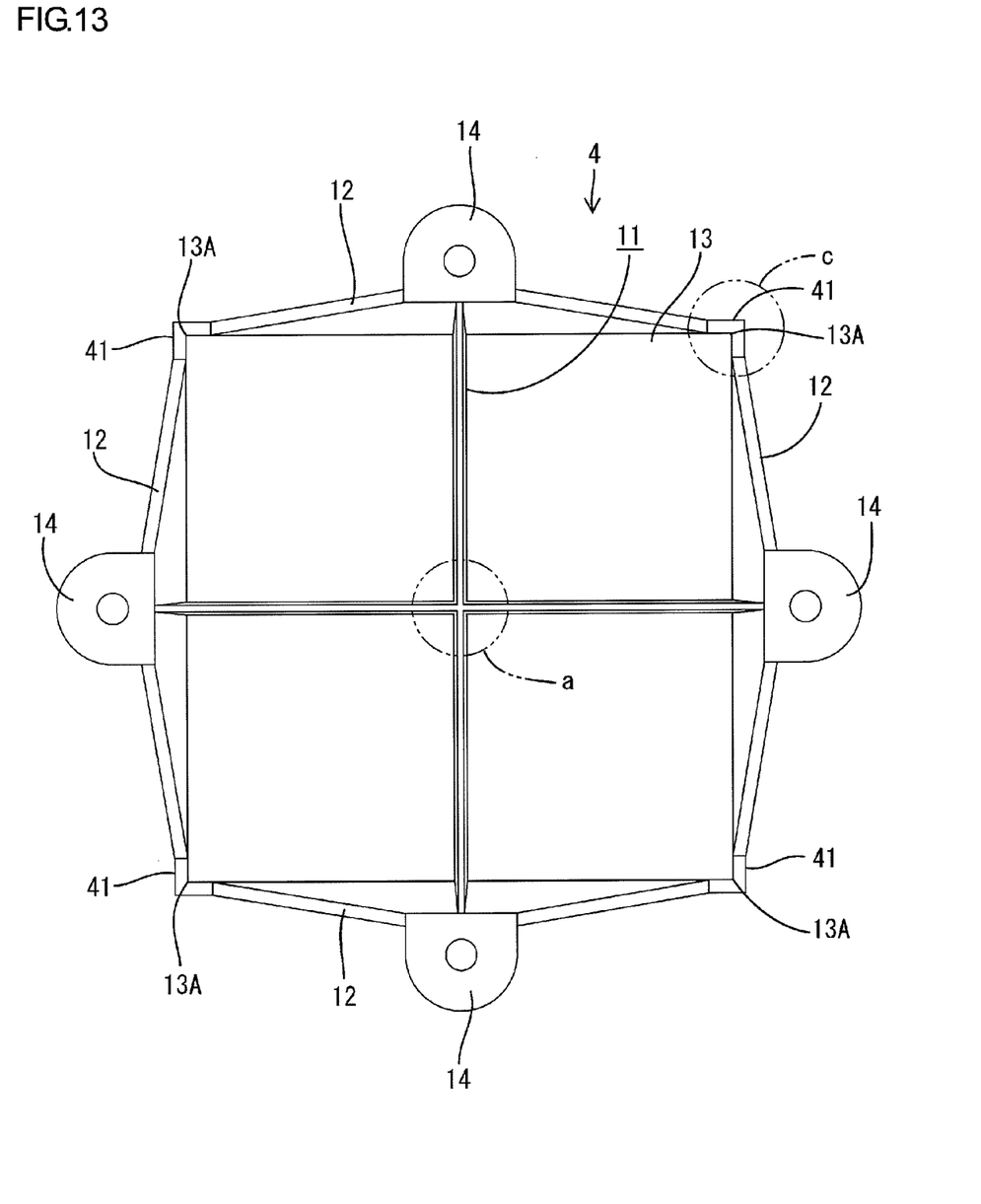
FIG. 13 is a rear view of the resinous impact-energy absorber as viewed from the door trim side, the rear view showing the locations of the impacted areas of FIG. 12.

Next, a second embodiment in accordance with the present invention will be explained with reference to FIGS. 11 through 13. Differently from the resinous impact-energy absorber 1, a resinous impact-energy absorber 4 of this embodiment includes restricting portions 41. While the outer walls 12 extend from the outer peripheral edges of the top plate 13, the restricting portions 41 are provided by connecting the outer walls 12 with each other in L-shapes. In this embodiment, the same configurations with the first embodiment are designated by the same reference numerals, while duplicative explanation of the configurations, the operations, and the effects are herein omitted.

The restricting portions 41 are connected with respective corner portions 13A of the top plate 13. Therefore, even if the impact energy is received at one of the corner portions 13A on the top plate 13 in the event of side impact, bending deflection of the corner portion 13A of the top plate 13 is restricted, so that the impact energy is transferred to the cross rib 11. The dashed line in FIG. 12 indicates the load when the impact energy is received at an impacted area "c" (the area of one of the corner portions 13A on the top plate 13 in FIG. 13) in the case of a configuration where no restricting portions 41 are provided (the configuration of the first embodiment) On the other hand, the solid line in FIG. 12 indicates the load when the impact energy is received at the impacted area "a" (the area located on the top plate 13 and corresponding to the connected portion 11B of the cross rib 11 in FIG. 13). As a result of this, it was confirmed that the substantially equal impact-energy absorbing performance is obtained at the impacted area "a" and the impacted area "c" in the case that the restricting portions 41 are provided.

Other Embodiments

The present invention is not limited to the embodiments described as above with reference to the drawings; for example, embodiments as follows are also included within the scope of the present invention.

(1) In the above embodiments, the resinous impact-energy absorber 1 is mounted on the plane portion of the door trim 2. In accordance with the present invention, the resinous impact-energy absorber 1 may be mounted on the concave-convex portion of the door trim 2 and over the concavities. Likewise, the resinous impact-energy absorber 1 may be mounted on an inclined surface portion or on a curved surface portion of the door trim 2.

(2) In the above embodiments, the opposed edges 11C of the cross rib 11 are connected with the respective contact edges 12A of the outer walls 12. In accordance with the present invention, the opposed edges 11C of the cross rib 11 may be connected with a portion away from the contact edges 12A and toward the top plate 13.

(3) In the above embodiments, the top plate 13 is connected with both of the cross rib 11 and the outer walls 12. In accordance with the present invention, the top plate 13 may be connected only with the cross rib 11.

(4) In the above embodiments, side edges of each of the outer walls 12 extend straight from the end edge 12B to the contact edge 12A. In accordance with the present invention, the side edges of each of the outer walls 12 may extend stepwise from the end edge 12B to the contact edge 12A.

(5) In the above second embodiment, the restricting portions 41 are connected with the respective adjacent side edges that configure the corner portions 13A of the top plate 13. In accordance with the present invention, the restricting portions may be connected with respective portions slightly inside from the adjacent side edges that configure the corner portions 13A of the top plate 13.

What is claimed is:

1. A resinous impact-energy absorber to be attached to an outside surface of a vehicle door trim with respect to a vehicle compartment so as to absorb side impact energy, the resinous impact-energy absorber comprising:
    a cross rib including four ribs and a connected portion, the four ribs extending in a direction to cross the outside surface of the door trim and connected with each other in a single cross shape by the connected portion,
    the ribs having respective side edges opposite from the connected portion and respective opposed edges extending from ends of the respective side edges to an end of the connected portion, the connected portion being shorter in length than the side edges so that the opposed edges are spaced apart from the outside surface of the door trim;
    at least one outer wall connected with at least one of the side edges of the ribs in a T-shape, the at least one outer wall having a contact edge capable of making contact with the outside surface of the door trim; and
    at least one seating face for securing the cross rib to the outside surface of the door trim via the at least one outer wall, the at least one seating face extending from the contact edge of the at least one outer wall and along the outside surface of the door trim.

2. The resinous impact-energy absorber according to claim 1 further comprising:
    a top plate opposed to the outside surface of the door trim; wherein:
        the cross rib has an end edge at a side opposite from the door trim, and
        the top plate is connected with the end edge of the cross rib.

3. The resinous impact-energy absorber according to claim 1, wherein:

the at least one outer wall has an end edge at a side opposite from the contact edge thereof; and the contact edge of the at least one outer wall is shorter than the end edge.

4. The resinous impact-energy absorber according to claim 2, wherein:

the at least one outer wall has an end edge at a side opposite from the contact edge thereof; and the contact edge of the at least one outer wall is shorter than the end edge.

5. The resinous impact-energy absorber according to claim 2 further comprising:

at least one restricting portion;

wherein:

the top plate has at least one corner portion;

the at least one outer wall includes a first outer wall and a second outer wall adjacent to the first outer wall;

the at least one restricting portion is disposed at least one of on and near the at least one corner portion of the top plate; and the at least one restricting portion connects the first outer wall with the second wall in an L-shape.

6. The resinous impact-energy absorber according to claim 3 further comprising:

at least one restricting portion;

wherein:

the top plate has at least one corner portion;

the at least one outer wall includes a first outer wall and a second outer wall adjacent to the first outer wall;

the at least one restricting portion is disposed at least one of on and near the at least one corner portion of the top plate; and the at least one restricting portion connects the first outer wall with the second wall in an L-shape.

7. The resinous impact-energy absorber according to claim 4 further comprising:

at least one restricting portion;

wherein:

the top plate has at least one corner portion;

the at least one outer wall includes a first outer wall and a second outer wall adjacent to the first outer wall;

the at least one restricting portion is disposed at least one of on and near the at least one corner portion of the top plate; and the at least one restricting portion connects the first outer wall with the second wall in an L-shape.

8. The resinous impact-energy absorber according to claim 1, wherein the outer wall narrows in width towards the contact edge.

* * * * *